US009161151B2

(12) United States Patent
Pan et al.

(10) Patent No.: US 9,161,151 B2
(45) Date of Patent: Oct. 13, 2015

(54) MANIPULATING SPATIAL PROCESSING IN AN AUDIO SYSTEM

(75) Inventors: Davis Y. Pan, Arlington, MA (US); Shiufun Cheung, Lexington, MA (US); Darby Edward Hadley, Westborough, MA (US); Ryo Maiguma, Tokyo (JP); Takao Nakayma, Tokyo (JP); Bruce C. Po, Waltham, MA (US); Katsumi Tomida, Kawachi-Nagano (JP); Petr Vicherek, Harvard, MA (US); Tobe Z. Barksdale, Bolton, MA (US); Ronald A. Fowler, Westford, MA (US)

(73) Assignee: Bose Corporation, Framingham, MA (US)

( * ) Notice: Subject to any disclaimer, the term of this patent is extended or adjusted under 35 U.S.C. 154(b) by 716 days.

(21) Appl. No.: 13/476,383

(22) Filed: May 21, 2012

(65) Prior Publication Data

US 2012/0230534 A1 Sep. 13, 2012

Related U.S. Application Data

(63) Continuation of application No. 11/845,484, filed on Aug. 27, 2007, now abandoned.

(51) Int. Cl.
*H04B 1/00* (2006.01)
*H04S 7/00* (2006.01)

(52) U.S. Cl.
CPC ............... *H04S 7/30* (2013.01); *H04R 2499/13* (2013.01)

(58) Field of Classification Search
CPC .................................................. H04R 2499/13
USPC ....................................... 381/56, 86, 80, 119
See application file for complete search history.

(56) References Cited

U.S. PATENT DOCUMENTS

| | | | | |
|---|---|---|---|---|
| 2001/0037194 | A1* | 11/2001 | Aarts et al. | 704/200 |
| 2006/0280316 | A1* | 12/2006 | Prince | 381/86 |
| 2007/0127734 | A1* | 6/2007 | Brulle-Drews | 381/86 |
| 2008/0273723 | A1* | 11/2008 | Hartung et al. | 381/302 |
| 2009/0136044 | A1* | 5/2009 | Xiang et al. | 381/2 |

FOREIGN PATENT DOCUMENTS

| | | | |
|---|---|---|---|
| EP | 1536664 | A2 | 6/2005 |
| GB | 2353193 | A | 2/2001 |
| JP | 2001-69597 | | 3/2001 |
| JP | 2006-148608 | A | 6/2006 |

OTHER PUBLICATIONS

First Office Action dated Apr. 8, 2011 for CN Application No. 200880104342.0.
Second Office Action dated Jul. 2, 2012 for CN Application No. 200880104342.0.
First Office Action dated Mar. 13, 2012 for JP Application No. 2010-520348.

(Continued)

*Primary Examiner* — Joseph Saunders, Jr.
*Assistant Examiner* — James Mooney

(57) ABSTRACT

A vehicle audio system that includes a source of audio signals, which may include both entertainment audio signals and announcement audio signals, speakers for radiating audio signals, and spatial enhancement circuitry comprising circuitry to avoid applying spatial enhancement processing to the announcement audio signals.

14 Claims, 4 Drawing Sheets

(56) References Cited

OTHER PUBLICATIONS

Japanese Utility Model Application No. H03-086259 (First Publication No. H05-031373)—no English version available.

Second Office Action dated Nov. 13, 2012 for JP Application No. 2010-520348.

Japanese Utility Model Application No. H04-73586 (First Publication No. H05-60096)—no English version available.

* cited by examiner

MANIPULATING SPATIAL PROCESSING IN AN AUDIO SYSTEM

PRIORITY CLAIM

This application is a continuation of U.S. patent application Ser. No. 11/845,484, filed Aug. 27, 2007, and published as U.S. Patent Publication 2009/0060208, the contents of which are incorporated in their entirely.

BACKGROUND

This disclosure relates to manipulating spatial processing in a vehicle audio system that is used to radiate entertainment audio and announcement audio.

SUMMARY

In one aspect, a vehicle audio system includes a source of audio signals, which may include both entertainment audio signals and announcement audio signals, speakers for radiating audio signals, and spatial enhancement circuitry comprising circuitry to avoid applying spatial enhancement processing to the announcement audio signals. The spatial enhancement circuitry may apply no spatial processing operations to the audio signals received from the source if there is announcement audio content in the audio signals received from the source. The spatial enhancement circuitry may include first alternately selectable circuitry for applying the spatial enhancement processing to the audio signals, second alternately selectable circuitry for applying no spatial enhancement processing to the audio signals, and circuitry for selecting the audio signals from the first or second alternately selectable circuitry based on the presence of announcement audio signal in the combined audio signals. The spatial enhancement circuitry may include circuitry for separating the audio signals from the audio signal source into entertainment audio signals and announcement audio signals, circuitry for applying spatial enhancement processing to the entertainment audio signals, and circuitry for combining the processed entertainment audio signals and the announcement audio signals. The source of audio signals may include a source of front audio signals that may contain front announcement audio signals, hereinafter referred to as front audio signals, and a source of rear audio signals that may contain rear announcement audio signals, hereinafter referred to as rear audio signals and the audio system may further include front spatial processing circuitry including first alternately selectable front circuitry for applying the spatial enhancement processing to the front audio signals, second alternately selectable front circuitry for applying no spatial enhancement processing to the front audio signals, and circuitry for selecting the audio signals from the first or second alternately selectable front circuitry based on the presence of announcement audio signal in the front audio signals. The audio may further include rear spatial processing circuitry that includes first alternately selectable rear circuitry for applying the spatial enhancement processing to the rear audio signals, second alternately selectable rear circuitry for applying no spatial enhancement processing to the rear audio signals, and circuitry for selecting the audio signals from the first or second alternately selectable circuitry rear based on the presence of announcement audio signal in the rear audio signals. The spatial enhancement circuitry may apply spatial enhancement processing to the entertainment audio signals and not apply spatial enhancement processing to the announcement audio signals.

In another aspect, a method for operating a vehicle audio system includes receiving audio signals that may contain announcement audio signals; if the received audio signals do not contain announcement audio signals, the method includes applying spatial processing to the received audio signals; and if the received audio signals include announcement audio signals, the method does not apply spatial processing to the announcement audio signals. The method may include, if the received audio signals include announcement audio signals and entertainment audio signals, applying spatial processing to the entertainment audio signals.

In another aspect, a vehicle audio amplifier includes an input terminal for receiving audio signals that may include announcement audio signals and spatial enhancement circuitry containing circuitry to avoid applying spatial enhancement processing to the announcement audio signals. The spatial enhancement circuitry may apply no spatial processing operations to the received audio signals if the received audio signals include announcement audio signals. The spatial enhancement circuitry may include first alternately selectable circuitry for applying the spatial enhancement processing to the combined audio signals, second alternately selectable circuitry for applying no spatial enhancement processing to the combined audio signals; and circuitry for selecting the audio signals from the first or second alternately selectable circuitry based on the presence of announcement audio signals in the combined audio signals. The spatial enhancement circuitry may include circuitry for separating the combined audio signals into entertainment audio signals and announcement audio signals, circuitry for applying spatial enhancement processing to the entertainment audio signals, and circuitry for combining the processed entertainment audio signals and the announcement audio signals. The input terminal may include an input terminal for receiving front audio signals that may include announcement audio signals, hereinafter referred to as front input terminal and an input terminal for receiving rear audio signals which may include announcement audio signals, hereinafter referred to as rear input terminal. The amplifier may further include front spatial processing circuitry including first alternately selectable front circuitry for applying the spatial enhancement processing to the front audio signals, second alternately selectable front circuitry for applying no spatial enhancement processing to the front audio signals, and circuitry for selecting the audio signals from the first or second alternately selectable front circuitry based on the presence of announcement audio signal in the front audio signals, and the audio system may further include rear spatial processing circuitry including first alternately selectable rear circuitry for applying the spatial enhancement processing to the rear audio signals, second alternately rear selectable circuitry for applying no spatial enhancement processing to the rear audio signals, and circuitry for selecting the audio signals from the first or second alternately selectable rear circuitry based on the presence of announcement audio signal in the rear audio signals.

DETAILED DESCRIPTION

Figure 1:
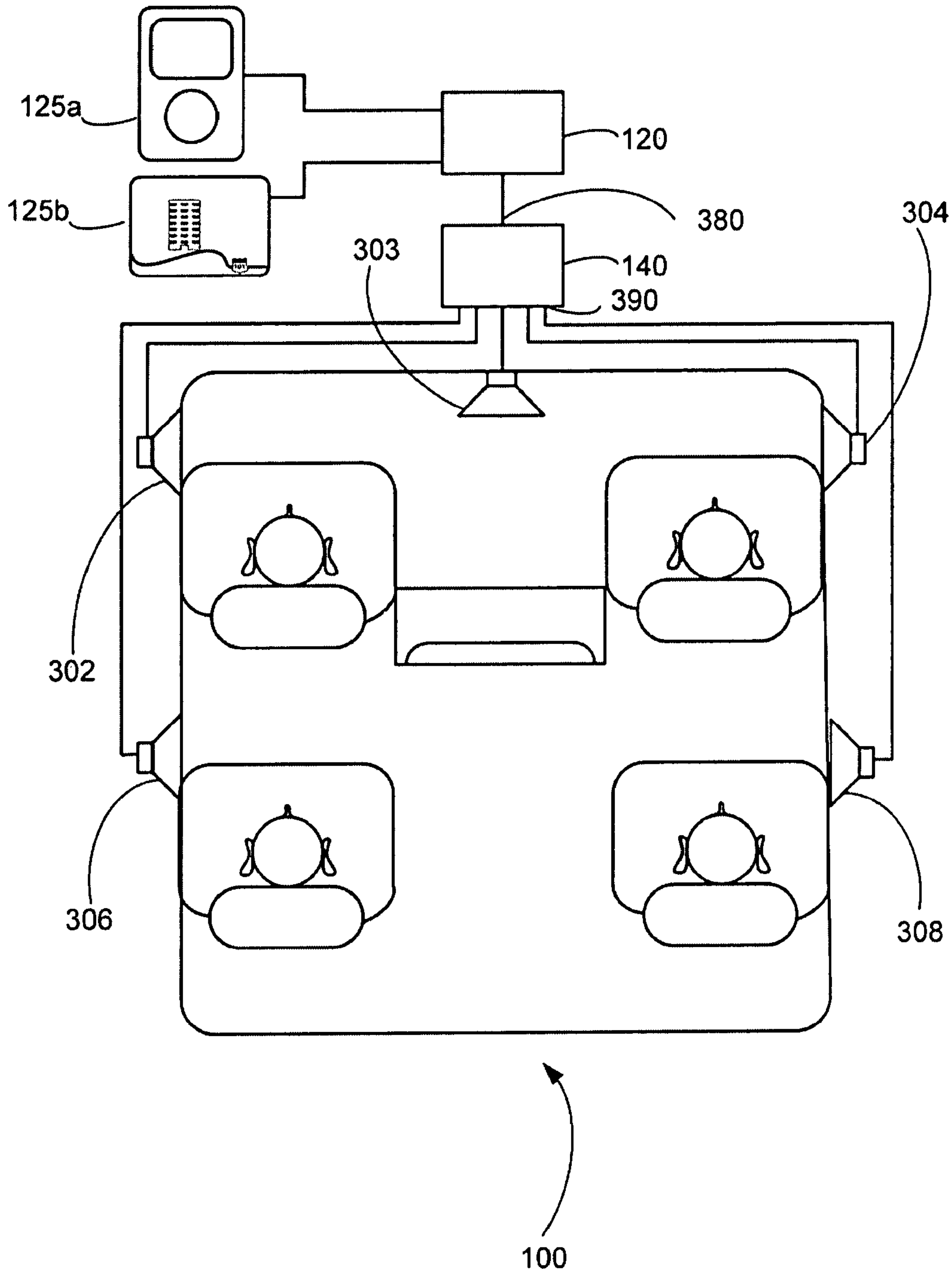
FIG. 1 is a block diagram of a vehicle with an audio system.

Referring to FIG. 1, a vehicle audio system 100 includes a head unit 120 coupled to an amplifier 140 through an amplifier input terminal 380. The amplifier 340 is in turn coupled to speakers 302, 303, 304, 306, and 308 through output terminals such a terminal 390. In this particular example, the head unit 120 provides a user with AM/FM tuning, and CD playback capability. The head unit 120 also is able to receive audio signals from external sources 125*a*, 125*b* providing audio to a vehicle listening space. The external audio sources may include digital music players (i.e. mp3, CD, DVD) 125*a*, portable navigation device 125*b*, a satellite radio receiver, and/or other sources. In addition to entertainment audio, the head unit 100 provides non-entertainment, announcement audio. Announcement audio may include navigation system audio instructions, vehicle chimes, enunciated announcements, cell phone chimes/rings, cell phone conversation, and other non-entertainment audio sources. Use double brackets ( ) or strikethroughs for deletions and underlines for additions.

The head unit 120 provides to amplifier 140 both the entertainment audio and announcement audio when present. The amplifier 140 include circuitry for applying spatial enhancement processing to the audio signal to enhance the presentation of entertainment audio inside the vehicle cabin. Spatial enhancement can include adding channels, such as center or surround channels, or other processing that can affect the spatial characteristics of the audio system, for example by "widening" the sound stage by modifying inter-aural crosstalk.

When announcement audio is present in a combined audio signal, spatially enhancing the combined entertainment and announcement audio signal can lead to undesirable audible artifacts. For example, the resulting audio presentation may include distorted sound, or bleeding of the announcement audio into entertainment audio. Similarly, the spatial enhancement processing could direct the pertinent audio signal so that the perceived source is in an illogical direction in relation to a listener's location.

In one particular example, a vehicle chime for reminding the car's occupants to fasten their seatbelt may sound as if it comes from the rear of the vehicle if certain spatial enhancement processing is applied to the signal. If this chime comes from the rear instead of the dashboard, occupants may be confused as to the meaning of the chime because most people are accustomed to warning/reminder chimes coming from the dashboard area of the vehicle. Misdirected signaling can be particularly concerning when audio signal is intended as a reminder or warning for the driver of a vehicle.

To reduce such audible artifacts the amplifier 140 contains circuitry that avoids applying to the spatial processing operations to announcement audio.

The head unit 120 also includes fader controls (not shown) that permit a user to control the relative volume between the front (302, 303, 304) and rear speakers (306, 308). For example, the user can manipulate the fader control to direct audio to be faded to the rear speakers only. However, in some implementations, the amplifier 140 directs announcement audio to the appropriate speaker to maintain the intended location of the announcement audio despite the fader setting. For example, if a DVD movie is playing for children in the rear seat, a parent may fade adjust the fade control so that the entertainment audio is directed completely to rear speakers (306, 308). However if a cellular phone connected to (or integrated within) the entertainment system 100 sends a ring chime signal to the amplifier 340, the amplifier 340 will present the ring chime in one or more of the front speakers (e.g., speaker 302, 303 and/or 304).

The processing of announcement audio can be done in at least two ways: a bypass mode and an extraction mode.

Figure 2:
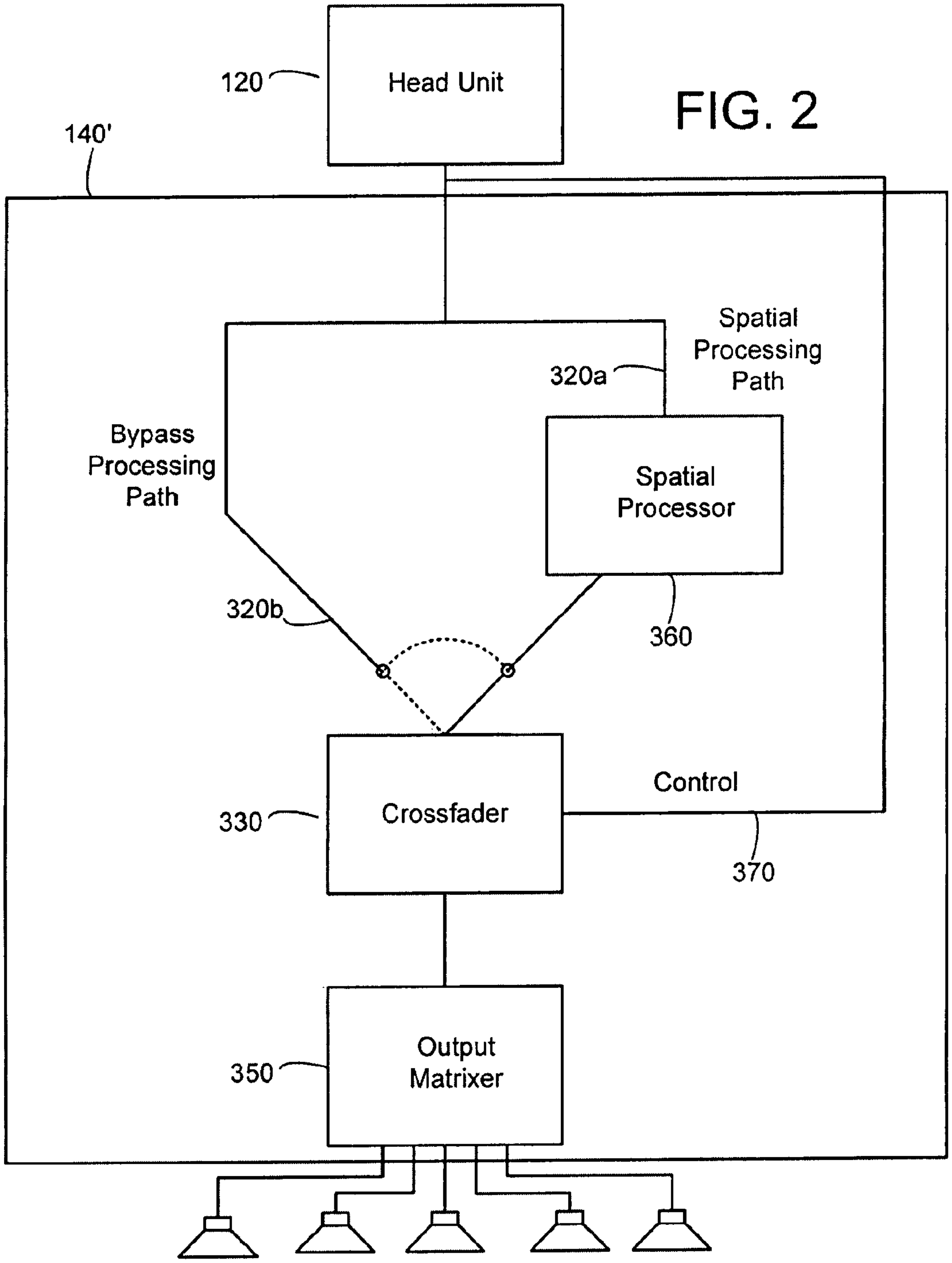
FIG. 2 is a block diagram of elements of the audio system in bypass mode.

For example, as shown in FIG. 2 an amplifier 140' in bypass mode includes two branches, 320*a, b*. An audio signal received from the head unit 120 is processed in parallel in both branches. Branch 320*a* applies spatial processing (e.g., spatial processing described in U.S. Pat. No. 7,016,501) and branch 320*b* applies no spatial processing. A crossfader 330 is coupled to both branches and selects audio from branch 320*a* or 320*b* based on an indication from a control signal from the head unit 120 on control signal line 370 as to the presence (or absence) of announcement audio.

The crossfader 330 also may process the selected signal so that transition from selection of one branch to another is smooth. The output matrixer then directs the audio signals to the appropriate speakers.

Figure 3:
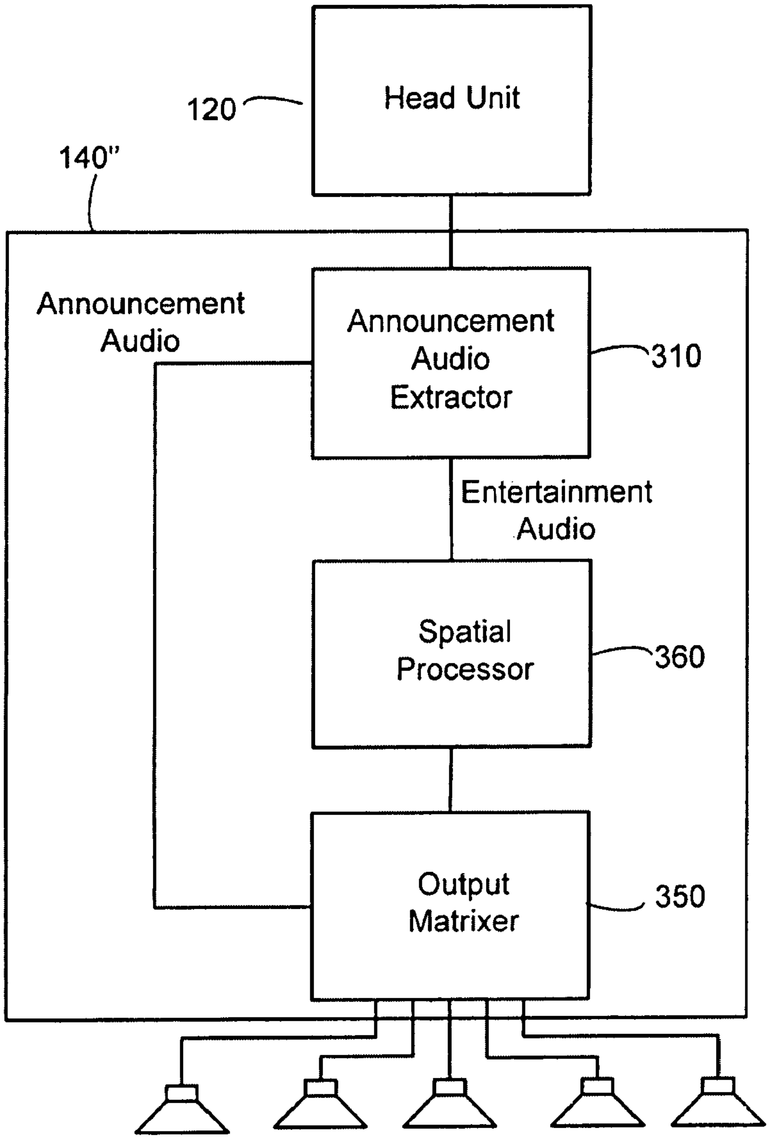
FIG. 3 is a block diagram of elements of the audio system in extraction mode.

As shown in FIG. 3, an amplifier 140" in extraction mode includes an announcement audio extractor 310 that extracts announcement audio from the signal received from the head unit. The remainder of the original signal (that is, the entertainment audio signal) is processed by spatial processor 360. The announcement audio is then summed back into the spatially processed entertainment audio signals at output matrixer 350. Audio signals are then directed to the associated speakers. In some implementations, the announcement audio is directed to associated speakers downstream from the application of fader settings, so that announcement audio is radiated properly irrespective of fader settings. In extraction mode, the speakers 302, 303, 304, 306, and 308 simultaneously radiate the spatially processed entertainment signals and the non-spatially processed announcement audio signals or radiate the spatially processed entertainment audio signals.

In systems in which the head unit transmits a front audio signal and a rear audio signal and inserts announcement audio in the front audio signal only, the announcement audio extractor 310 may compare the front audio signal and the rear audio signal and extract the difference between the front audio signal and the rear audio signal to determine the announcement audio content.

Figure 4:
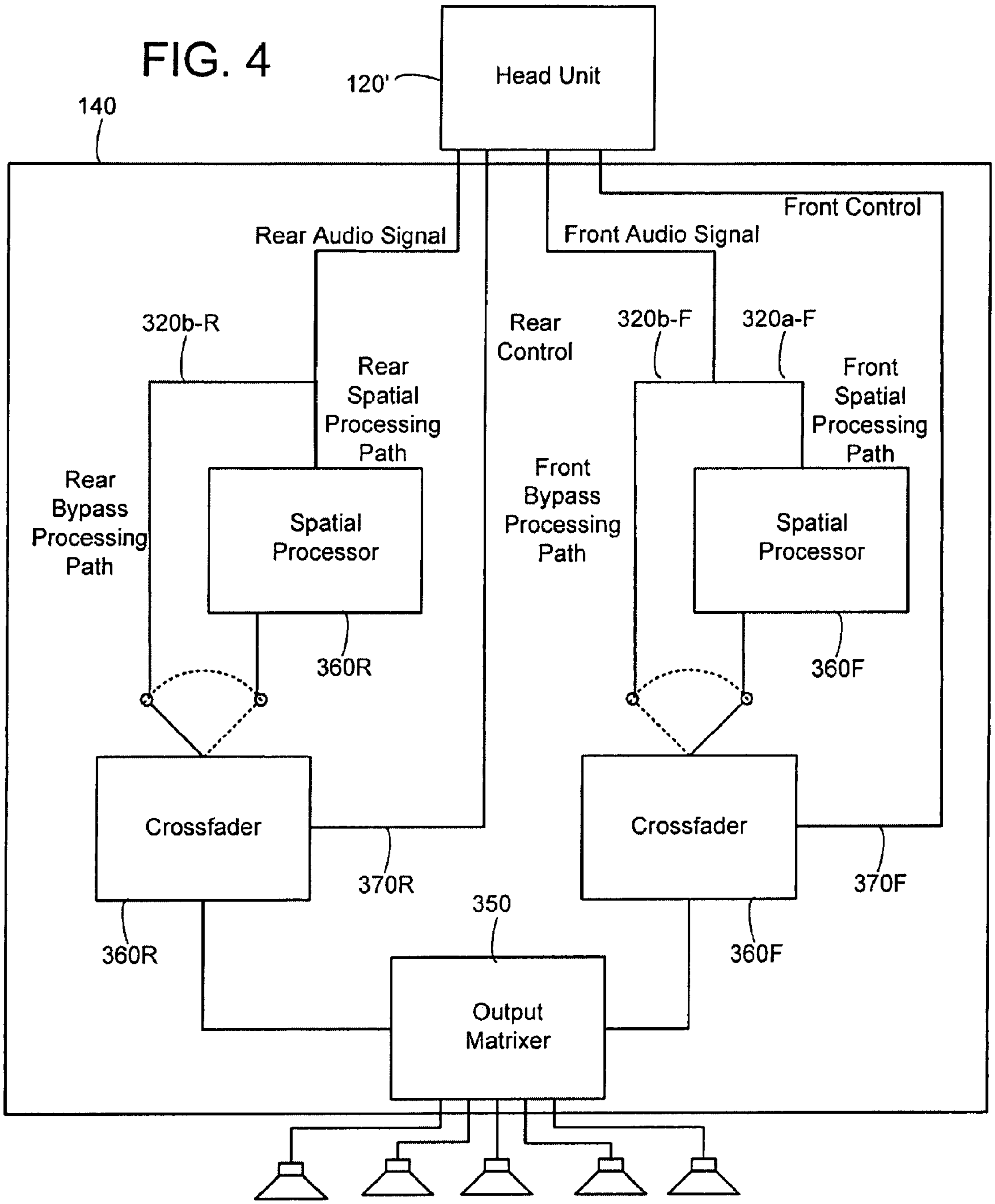
FIG. 4 is a block diagram of elements of an audio system with two spatial processing paths

Referring to FIG. 4, a head unit 120' is coupled to two processing paths that are each similar to the processing path illustrated in FIG. 2. A front audio signal (i.e., the audio signals intended for speakers located in the front portion of the automobile's cabin) is processed separately from the rear audio signal (i.e., the audio signals intended for speakers located in the rear portion of the cabin). Each path includes a separately controlled crossfader (360R, 360F) so that, for example, the front crossfader 360F can select the spatially processed signal from signal path 320*a*-F based on the absence of announcement audio as indicated by the absence of an indication on front control line 370F. Similarly, the rear crossfader 360R could select the bypassed signal from signal path 320*b*-R based on the presence of announcement audio as indicated by the presence of an indication on control line 370R. An amplifier that contains two implementations of the spatial pathway permits announcement audio to be separately radiated by both front and rear speakers, with less likelihood of misdirection. The use of multiple pathways permits greater flexibility in system design and allows for more announcement audio radiation source points. For example, some automobile warning systems have sensors that detect if there is an object near the rear of the automobile if the automobile is in reverse gear. The warning noise can come from one or both of the rear speakers, providing an audible cue of the presence of the object near the rear of the automobile.

Though the elements of several views of the drawing may be shown and described as discrete elements in a block diagram and may be referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Unless otherwise indicated, signal lines and terminals may be implemented as discrete analog or digital signal lines or terminals, as a single discrete digital signal line or terminal with appropriate signal processing to process separate streams of audio signals, or as elements of a wireless communication system. Some of the processing operations may be expressed in terms of the calculation and application of coefficients. The equivalent of calculating and applying coefficients can be performed by other analog or digital signal processing techniques and are included within the scope of this patent application. Unless otherwise indicated, audio signals or video signals or both may be encoded and transmitted in either digital or analog form; conventional digital-to-analog or analog-to-digital converters may be omitted in some figures. Audio signal processing (for example equalization) that does not significantly affect the spatial characteristics of the audio is omitted from the figures. For simplicity of wording "radiating acoustic energy corresponding to entertainment audio signals" may be referred to as "radiating entertainment audio signals", and "radiating acoustic energy corresponding to announcement audio signals may be referred to as "radiating announcement audio signals."

A number of embodiments of the invention have been described. Nevertheless, it will be understood that various modifications may be made without departing from the spirit and scope of the invention. Accordingly, other embodiments are within the scope of the following claims.

What is claimed is:

1. A vehicle audio system comprising:

an input for receiving input audio signals;

an announcement audio extractor configured to extract announcement audio content from the input audio signals and output the extracted announcement audio content and entertainment audio content remaining in the input audio signals after extraction of the announcement audio content;

a spatial processor configured to receive the entertainment audio content from the announcement audio extractor and apply spatial processing to the entertainment audio content to output spatially processed entertainment audio content; and an output matrixer configured to receive the announcement audio content from the announcement audio extractor and the spatially processed entertainment audio content from the spatial processor, and combine the announcement audio content and the spatially processed entertainment audio content to generate output audio signals; and an output for providing the output audio signals, wherein the input receives front and rear input audio signals, and the announcement audio extractor compares at least one front audio input signal to at least one rear audio input signal and extracts the difference between the compared front and rear audio input signals as the announcement audio content, and inserts the announcement audio signal in the front audio signal only.

2. The vehicle audio system of claim 1, further comprising speakers for radiating the output audio signals.

3. The vehicle audio system of claim 1, wherein the spatial processor is configured to apply the spatial processing by adding channels to the entertainment audio content.

4. The vehicle audio system of claim 1, wherein the spatial processor is configured to apply the spatial processing by widening the sound stage of the entertainment audio content.

5. The vehicle audio system of claim 1, wherein the input audio signals include front audio signals and rear audio signals; and the spatial processor is configured to apply the spatial processing by applying fader settings to the front and rear audio signals.

6. A method for operating a vehicle audio system comprising:

receiving input audio signals;

extracting announcement audio content from the input audio signals;

applying spatial processing to entertainment audio content remaining in the input audio signals after extraction of the announcement audio content;

combining the extracted announcement audio content and the spatially processed entertainment audio content to generate output audio signals; and outputting the output audio signals, wherein the input audio signals comprise front and rear audio signals, and extracting the announcement audio content comprises comparing at least one front audio signal to at least one rear audio signal and extracting the difference between the compared front and rear audio signals as the announcement audio content, and inserting the announcement audio signal in the front audio signal only.

7. The method of claim 6, further comprising operating speakers to radiate the output audio signals.

8. The method of claim 6, wherein applying spatial processing comprises adding channels to the entertainment audio content.

9. The method of claim 6, wherein applying spatial processing comprises widening the sound stage of the entertainment audio content.

10. The method of claim 6, wherein the input audio signals include front audio signals and rear audio signals; and applying spatial processing comprises applying fader settings to the front and rear audio signals.

11. A vehicle audio amplifier comprising:

input terminals for receiving input audio signals; and an announcement audio extractor configured to extract announcement audio content from the input audio signals and output the extracted announcement audio content and entertainment audio content remaining in the input audio signals after extraction of the announcement audio content;

a spatial processor configured to receive the entertainment audio content from the announcement audio extractor and apply spatial processing to the entertainment audio content to output spatially processed entertainment audio content;

an output matrixer configured to receive the announcement audio content from the announcement audio extractor and the spatially processed entertainment audio content from the spatial processor, and combine the announcement audio content and the spatially processed entertainment audio content to generate output audio signals;

an output amplifier stage configured to amplify the output audio signals; and output terminals for providing the output audio signals, wherein the input terminals comprise at least two input terminals for receiving front and rear input audio signals, and the announcement audio extractor compares at least one front audio input signal to at least one rear audio input signal and extracts the difference between the compared front and rear audio input signals as the announcement audio content, and inserts the announcement audio signal in the front audio signal only.

12. The vehicle audio amplifier of claim 11, wherein the spatial processor is configured to apply the spatial processing by adding channels to the entertainment audio content.

13. The vehicle audio amplifier of claim 11, wherein the spatial processor is configured to apply the spatial processing by widening the sound stage of the entertainment audio content.

14. The vehicle audio amplifier of claim 11, wherein the input audio signals include front audio signals and rear audio signals; and the spatial processor is configured to apply the spatial processing by applying fader settings to the front and rear audio signals.

* * * * *